No. 713,006. Patented Nov. 4, 1902.
W. M. KIMBERLIN.
PNEUMATIC TIRE REPAIRING TOOL.
(Application filed Mar. 5. 1902.)
(No Model.)

Witnesses:
Walter Bowman.
Maude Grisler.

Inventor:
Winfield M. Kimberlin,
by Humphrey & Humphrey,
Attorneys.

UNITED STATES PATENT OFFICE.

WINFIELD M. KIMBERLIN, OF AKRON, OHIO, ASSIGNOR OF ONE-HALF TO EDWARD C. EIPPERT, OF AKRON, OHIO.

PNEUMATIC-TIRE-REPAIRING TOOL.

SPECIFICATION forming part of Letters Patent No. 713,006, dated November 4, 1902.

Application filed March 5, 1902. Serial No. 96,813. (No model.)

*To all whom it may concern:*

Be it known that I, WINFIELD M. KIMBERLIN, a citizen of the United States, residing at Akron, in the county of Summit and State of Ohio, have invented a certain new and useful Improvement in Pneumatic-Tire-Repairing Tools, of which the following is a specification.

My invention has relation to improvements in that class of instruments for repairing punctures in pneumatic tires, hose, and like instrumentalities by which a number of strands of rubber or bands in a strained condition are thrust through the puncture and by the withdrawal of the tool are relaxed and permitted to contract from each direction, and as a consequence expand within the puncture, filling the opening, leaving only the surplus on the outside to be cut away.

The object of my invention is to produce a new, simple, and effective tool for closing these punctures in the manner stated that is simple in construction, of a convenient size to be carried in the vest-pocket, and that will permit the strained strands to be gently brought against the tire to prevent them from drawing into the tire by sudden contraction.

To the attainment of the aforesaid object my invention consists of certain peculiarities of construction and combination of parts shown in the accompanying drawings, as hereinafter described, and then specifically distinguished in the claims.

Figure 1:
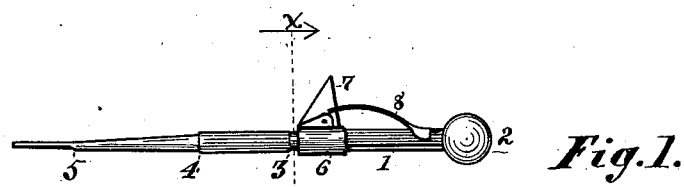
Figure 2:
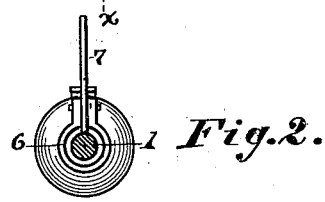
Figure 3:
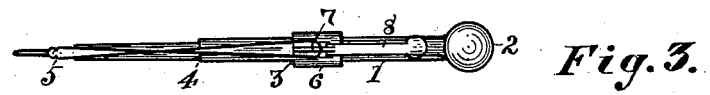
Figure 4:
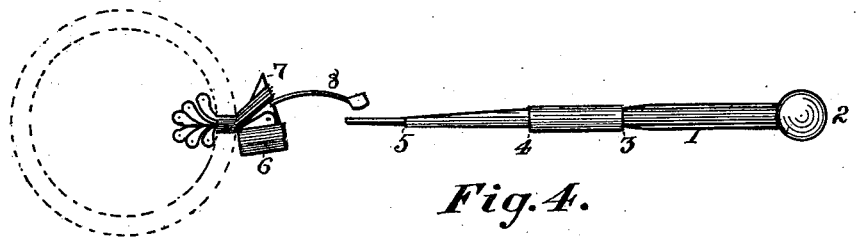

In the accompanying drawings, in which similar reference-numerals indicate like parts in the different views, Figure 1 is a side elevation; Fig. 2, a section, twice enlarged, at the line $x\,x$ of Fig. 1 looking from the left thereof; Fig. 3, a view of Fig. 1 looking from above, and Fig. 4 a view of the tool immediately after its use and before the rubber strands have been removed from the blade of the sliding sleeve.

Referring to the drawings, 1 is a short cylindrical shaft, bearing, for convenience of a finger-grip, a head 2. This shaft tapers from a short distance above it to a slight shoulder 3, whence it continues of the same size to the shoulder 4, below which it is reduced slightly, and continues of even size to the shoulder 5, whence it extends in the form of a small tapering awl to an awl-point. Backward from the shoulder 5 the shaft is flattened or grooved away on one side nearly or quite to the point 4 to form a space to be occupied by the strained rubber strands in crossing each other. A sleeve 6, large enough on the interior to slide freely on the shaft is in use placed on the shaft 1, and this sleeve has at one side a lateral projection, preferably in form of a pivoted radial blade 7, the upper edge of which is at a right angle to the axis of the sleeve. To this blade 7 is fastened a spring 8, that has at the opposite free end side leaves that constitute guides and form a slide to ride on the shaft 1, and this spring constantly tilts the blade in the sleeve, so that the inwardly-tilted end will engage the shoulder 3 and prevent the sleeve passing farther down the shaft until the force of the spring is overcome.

In operation small rubber bands are employed and are wrapped around the awl-point, thence strained back, crossed and passed over the blade 7, and again to the awl-point, and in this manner backward and forward until the strands of the band are all used, as suggested in Fig. 2, the strands lying backward from the shoulder 5 on the flattened portion before referred to. The tool is then inserted in the puncture and pushed far enough inward so that when withdrawn a surplus of the strands in normal condition will be left within the tire. The blade 7 is then tilted by drawing the projecting end back with the finger and the sleeve 6 slipped carefully down against the tire. The tool is then withdrawn, as illustrated in Fig. 3, leaving the sleeve 6, which latter is withdrawn by tilting until the strands pass off the blade 7, when it is withdrawn. In this operation a cement suitable for the purpose is placed on the rubber strands and after the tool has been finally withdrawn the surplus of the strands on the outside of the tire are excised with a sharp knife.

Having thus described my invention, what I claim, and desire to secure by Letters Patent, is—

1. An improved repair-tool of the class stated embodying a shaft with an awl-point with a shoulder above it, an intermediate part ending at a second shoulder, a shoulder above said second shoulder, produced by tapering the shaft from a short distance above, a sleeve adapted to slide freely on said shaft having a radial blade, and a spring to tilt said blade to cause it to engage the last-named shoulder, substantially as shown and described, and for the purpose specified.

2. An improved repair-tool of the class stated embodying a shaft with an awl-point with a shoulder, and flattened on one side from the shoulder backward, a second shoulder formed by tapering the shaft from above, a sleeve adapted to slide freely on said shaft having a radial blade, and a spring to tilt said blade to cause it to engage said last-named shoulder, substantially as shown and described.

3. In a repair-tool of the class designated, the combination with a shaft having a single awl-point with a shoulder above it to engage strands of strained rubber, of a sleeve adapted to loosely slide on said shaft having a lateral rocking projection preferably in form of a radial blade to engage said strands of rubber, and an obstruction on said shaft to engage the inner end of said blade and prevent the passage of said sleeve until the obstructed end is raised against the resistance of said bands, substantially as shown and described.

4. In a repair-tool of the class designated, the combination with a shaft having a single awl-point with a shoulder above it to engage strands of strained rubber, of a sleeve adapted to loosely slide on said shaft having a lateral pivoted projection preferably in form of a radial blade to engage said strands of rubber, and a depression in said shaft to engage the inner end of said blade and prevent the passage of said sleeve until the obstructed end is raised against the resistance of said bands, substantially as shown and described.

In testimony that I claim the above I hereunto set my hand in the presence of two subscribing witnesses.

WINFIELD M. KIMBERLIN.

In presence of—
  C. E. HUMPHREY,
  C. P. HUMPHREY.